United States Patent

Sanderson

Patent Number: 5,183,696
Date of Patent: Feb. 2, 1993

[54] COATING OF SUBSTRATES

[75] Inventor: Martin C. Sanderson, York, England

[73] Assignee: CCL Label, Inc., Grand Rapids, Mich.

[21] Appl. No.: 525,382

[22] Filed: May 17, 1990

[30] Foreign Application Priority Data

May 17, 1989 [GB] United Kingdom ............... 8911354

[51] Int. Cl.⁵ .................................. C09J 7/02
[52] U.S. Cl. ................................ 428/194; 428/195; 428/211; 428/341; 428/342; 428/352; 428/354
[58] Field of Search ............ 428/194, 195, 211, 341, 428/342, 353, 352, 354

[56] References Cited

U.S. PATENT DOCUMENTS

| | | | |
|---|---|---|---|
| 3,632,386 | 1/1972 | Hurst | 428/352 |
| 4,056,661 | 11/1977 | Sato | 428/352 |
| 4,391,853 | 7/1983 | Pointon | 428/914 |
| 4,587,167 | 5/1986 | Maietti | 428/352 |
| 4,604,153 | 8/1986 | Melbye | 428/914 |

Primary Examiner—Jenna L. Davis
Attorney, Agent, or Firm—Warner, Norcross & Judd

[57] ABSTRACT

The invention provides a substrate forming a web of primary labels. One side has a silicone release coating and the other side has pressure sensitive adhesive so that the web can be wound into roll form without the use of a carrier sheet. In order to enable overprinting or secondary labels to be anchored to the primary labels a keying coating is applied over the silicone release coating, said keying coating comprising basically a silicone low tack pressure sensitive adhesive mixed with an organic solvent.

9 Claims, 3 Drawing Sheets

COATING OF SUBSTRATES

This invention relates to the coating of substrates, and in particular the coating of substrates which are in the nature of sheet material. Such sheets may be in web form or discrete sheet form, as will be clear from the following description, but in order to simplify an understanding of the basic concept of the invention, the majority of the description given hereinafter relates to the coating of substrate webs, particularly webs on which labels are defined.

The base material of the substrate is not of particular importance to the present invention, and therefore any suitable type of material such as paper, plastics material, foil or combinations of these materials may be used.

We have been concerned with the technology of developing self-adhesive labels and according to that development a substrate web printed with the label information on a repeating basis to define the labels is provided on one side of the web with a release characteristic, typically achieved by coating the side of the web with a silicone release material. Preferably, the other side of the web has a pressure sensitive adhesive applied thereto, so that the resulting web has the advantage that it can be wound into reel form for storage and subsequent use without the necessity of having to use an intermediate release web which is conventionally used for self-adhesive labels. The invention can also be applied to discrete labels which are in block form wherein the individual labels have an adhesive side and a silicone release side, the labels being arranged one on top of another to define a block.

The labels in which we are particularly interested are what are referred to as primary labels insofar as these labels are applied to products in order to describe the product and identify same. Primary labels are relatively large and occupy a large portion of the surface area of the product. For example, a primary label for a can may cover the whole of the cylindrical surface of same. On the other hand, there are so-called secondary labels which are relatively small labels to indicate items such as price, sell by date, or other matter which is ancillary to the information conveyed by the primary label. Secondary labels may typically be applied to products by means of a hand gun or the like.

Whilst the present invention can be applied to secondary labels, it has much better application as will be clear from the following to primary labels and the substrates used for the manufacture of such primary labels.

Conventionally, self-adhesive primary labels are defined in a substrate web having pressure sensitive adhesive on one side thereof. The web is laminated with a carrier web having a silicone release characteristic at least on the side which faces and contacts the pressure sensitive adhesive. The two webs are wound together to form a reel of labels, and the individual labels are die cut from the substrate web by cutting through that web but not the carrier web. For the application of the labels, the laminated web is unwound, and the individual labels are peeled from the carrier web for application to the product. As distinguished from this method, when a label web of the type in which we are interested and having the pressure sensitive adhesive on one side and a silicone release coating on the other side is used, the labels are simply cut from the web and applied to the products and it is not necessary to have the carrier web or liner as is the case in the conventional method.

In the field of primary labelling, it is often required to apply secondary printing to the label to mark, over-label or code the labels but the use of a silicone coating for providing the release characteristic as described above in fact makes this extremely difficult. The problem does not arise in connection with the conventional method described above, because the side of the label opposite the pressure sensitive adhesive does not have or is not necessarily provided with a silicone release coating.

Additionally, the application of secondary labels to primary labels which have a silicone release coating renders the removal of the secondary labels particularly easy, which is undesirable as they can be removed by unauthorised personnel. The application of coding for example by ink jet printing to the silicone coating is ineffective insofar as the coding can be readily rubbed off; there is in fact no keying of the ink to or penetration of the ink into the substrate because of the presence of the silicone layer. Equally, attempts to foil block the label through the silicone layer to provide coding have proved unsuccessful as the foil fails to transfer to the silicone coating surface.

Other attempts have been made to render the silicone surface more receptive to secondary printing or marking, and one treatment which has been tried is the corona discharge treatment. This treatment involves producing a surface charge on the silicone coating by using high energy input, and this charge serves as a means for adhering secondary labels or the printing to the silicone coating, but unfortunately the surface charge effect has proved to be short lived and lasts only in the order of 2-20 minutes. The secondary labels or overprinting must be applied within this time frame and this is too big a limitation because it is often the case that secondary labels or overprinting have to be applied many hours after for example the application of the silicone coated labels to the products.

The present invention seeks to overcome this disadvantage, and in accordance with the invention a keying coat is applied over the surface of the substrate which has a silicone release characteristic, said keying coating comprising a liquid medium which is basically a mixture of a silicone low tack pressure sensitive adhesive and an organic or other solvent, and wherein the applied keying coat is allowed or caused to dry before application of overprinting or other labels to the key coated surface.

The keying coat liquid preferably is transparent so as not to effect the viewability of the surface which it covers, especially where such surface presents primary label information to the viewer. It is preferred therefore that the keying liquid be clear, but it may in some instances be translucent, in which case it could be coloured.

The keying liquid may be applied by any suitable means such as roller coating, nozzle spraying, or other print techniques such as litho or offset, and the keying coat although preferably applied over the entire silicone release surface of the substrate, can be applied only in discrete areas or in a pattern sufficient to provide the keying surface for the labels or secondary or overprinting subsequently to be applied.

It is preferred that the keying liquid which is applied to the substrate be positively dried using a suitable drier system such as hot air, or hot or cold air jets, and in this connection it is desirable that drying should take place as quickly as possible. To achieve the rapid drying, it is preferred that as small a solvent content as possible be used in the keying liquid and it is also desirable that as little of the keying liquid as is necessary be used in the coating operation.

It has been shown that when the silicone pressure sensitive adhesive is dry the resulting surface is highly receptive to secondary labels and printing applied by ink jet code printers, foil blocking systems and the like. Such secondary labels and overprinting can be applied at any time after the keying coat has dried. In some cases the secondary labels or overprinting will be applied immediately after the keying coat has dried whilst in other instances, for example where the substrate is formed into primary labels as described above and applied to products, the secondary labels and overprinting may be applied to the labels when on the products.

The ability of silicone based pressure sensitive adhesive to bond to silicone release material is utilised in this invention and the resulting key coat provides a platform suitable for other materials to key or adhere thereto.

In a particular embodiment, a substrate web roll has label information printed thereon, pressure sensitive adhesive on one side of the web and silicone release material on the other side of the web, and the roll is wound without a carrier sheet or liner. The web is unrolled in a label application machine, and as the web passes through the machine the labels are cut from the web and applied to articles which are fed one by one to an application station where the labels are applied. In such apparatus, of which one embodiment is described fully in European Patent Application 0220707, there may be added a key coat application station and a drier for drying the key coat after application, these stations being upstream of the application station where the labels are applied to the products. The labelling equipment may also include if appropriate a printing station for the application of overprint material to the labels. The overprint will of course be applied after the application of the key coat, because the key coat serves to provide a base for the anchoring of the overprinting to the label.

Although many low tack adhesive preparations may be utilised, and they may be modified and varied as appropriate, in initial trials we have found that the low tack pressure sensitive adhesive sold by General Electric Company under the name PSA 6573 under the trade mark Silgrip has proved to be satisfactory. A supply of such material was further reduced to 50% solid by the addition of toluene, and the resulting composition was applied to the substrate by conventional meyerbar techniques in a weight of the order of 1-4 g/sq m. The key coat was subjected simply to atmospheric drying, and the resulting product performed satisfactorily. It is believed that properties may be enhanced by the addition of appropriate modifiers.

An embodiment of one example of apparatus which can be used in connection with the present invention, and which in itself is apparatus according to the invention, is illustrated in the accompanying drawings, wherein.

Figure 1:
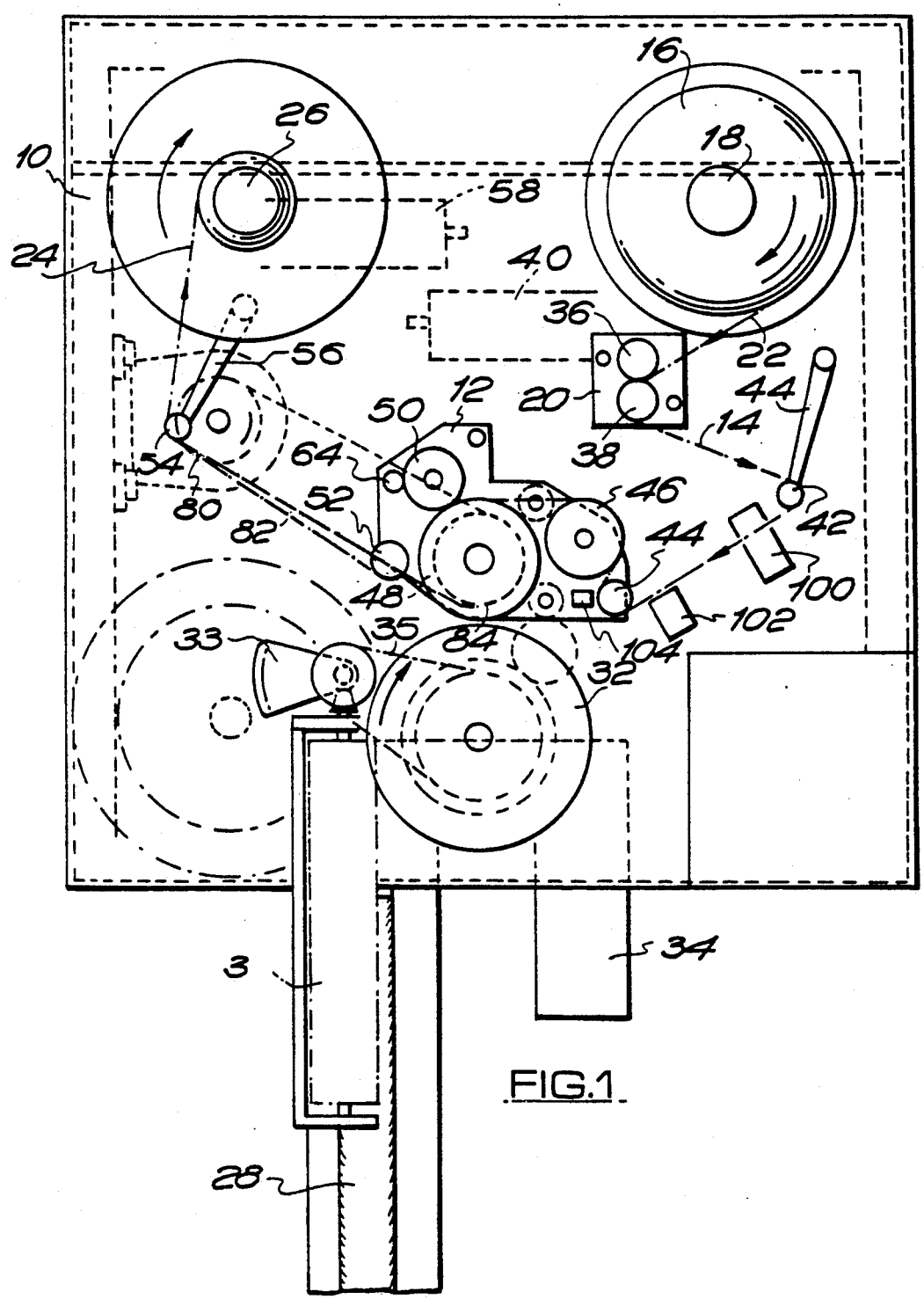
FIG. 1 is a diagrammatic plan view of a labelling apparatus.
Figure 2:
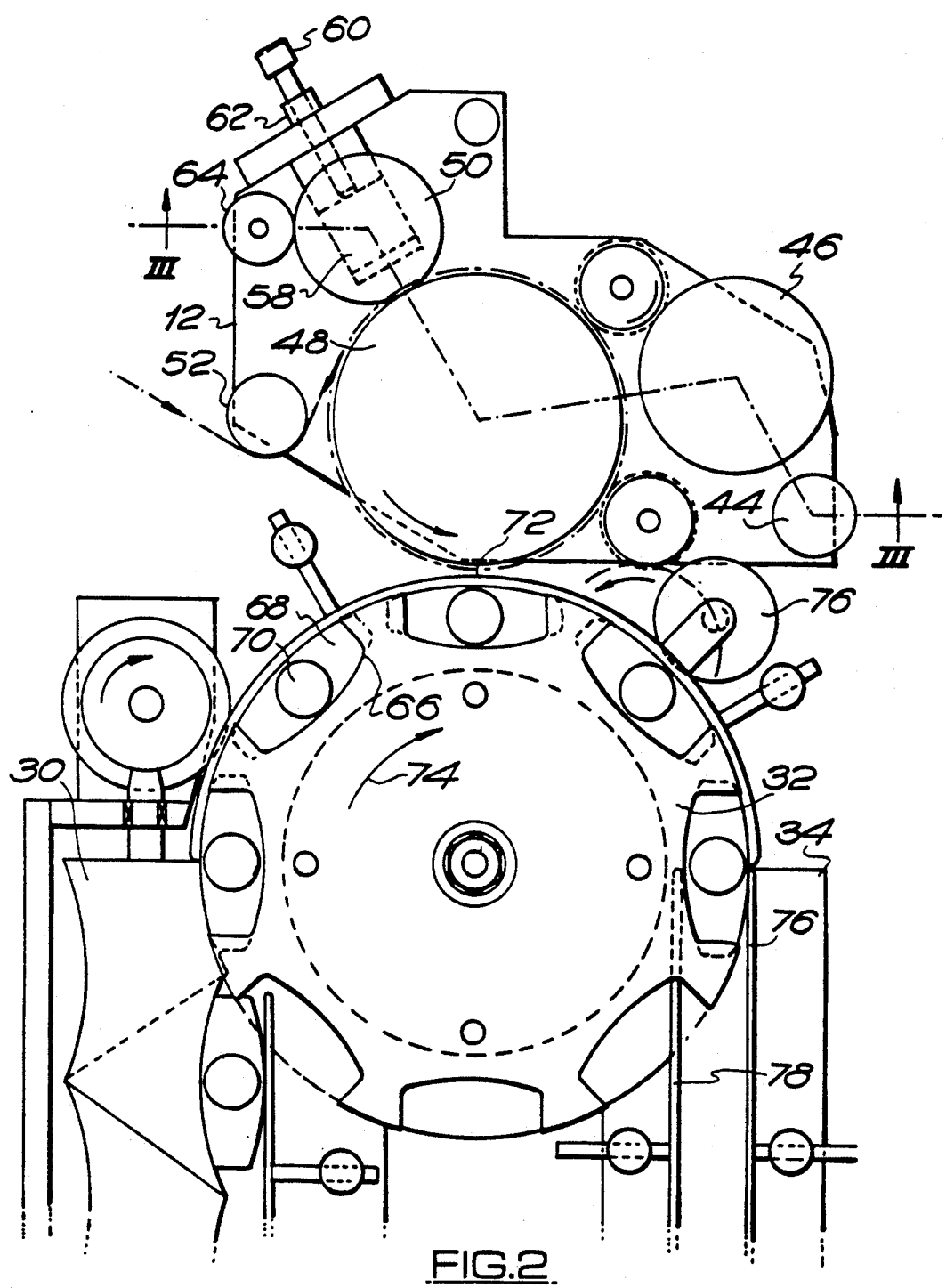
FIG. 2 is a diagrammatic plan view to an enlarged scale of a portion of the apparatus shown in FIG. 1.

The apparatus shown in FIGS. 1 and 2 is fully described in European Patent Application 0220707 to which reference is made insofar as the following description does not describe in detail all of the illustrated components as are described in the said European patent application and therefore reference in the following may not be made to all of the reference numerals in the drawings.

Basically, the apparatus shown in FIGS. 1 and 2 operates in that a substrate web 16 in roll form is carried on a spindle 18 and is fed through the machine as a label web 14 as indicated by the chain dotted line. The web leaves the roll 16 as indicated at 22 and travels through the machine until it reaches a pair of cooperating rollers 50 and 48. Roller 50 is a cutting roller and cuts labels from the web leaving a skeletal waste, and roller 48 is a vacuum roller which holds the labels to the surface until eventually they are applied to products travelling in feed roller 32. The web skeletal waste is eventually re-wound on axle 26 and arrives at the axle as indicated by reference 24.

The web 14 as will be understood is printed to define primary labels, and one side has a silicone release coating, and the other side has a pressure sensitive adhesive applied thereto. The release coating is to the outside of the web when in reel form 16.

FIG. 2 shows that the products to which the labels are applied are bottles 68 having caps 70 and roller 32 is provided with circumferential recesses for receiving the bottles 68.

For one example of the application of the key coat, the apparatus described in the said European patent application is modified and is provided with key coat application apparatus 100 by which the key coat is applied to the silicone coated side of the web. The application apparatus 100 is followed by drying apparatus 102 for drying the key coat before the web enters the cutting head. If required, the labeller may also have an application device 104 for applying secondary labels or overprinting to the web 14, but it will be appreciated that such application apparatus can be located so as to apply the overprinting or secondary label to the product after the application of the primary label, or indeed the secondary label or overprinting may be applied to the label when on the product, but at a considerably later time, for example prior to sale of the product. Also, it may be that in another embodiment the key coat is applied to the substrate after the label has been applied to the product.

Figure 3:
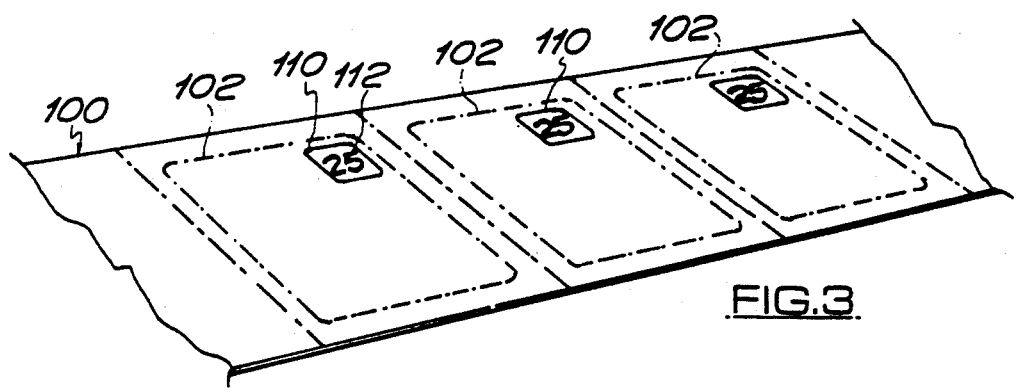
FIG. 3 is a perspective view of a portion of a substrate web according to the invention.
Figure 4:
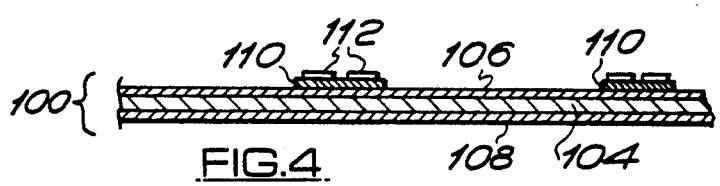
FIG. 4 is a sectional elevation to an enlarged scale of the web shown in FIG. 3.

Referring to FIGS. 3–7, and firstly to FIGS. 3 and 4, a substrate web 100 is shown, and this is in the form of a web of labels indicated by outlines 102, such labels being delineated by appropriate printing on the substrate web 100.

As shown in FIG. 4, the web 100 comprises a web 104 of suitable material such as paper foil, plastics film or a laminated material on the top surface of which is provided a coating of silicone release material 106, whilst to the underside is provided a pressure sensitive adhesive layer 108 so that in fact the substrate web can be wound into roll form without the use of a backing or carrier web such as is conventionally used in rolled primary label webs.

The printing defining the labels 102 is laid down on the upper surface of the base web 104 prior to the application thereto of the silicone release coating 106.

As shown in FIGS. 3 and 4, the keying coat 110 is applied in discrete areas over the silicone release coating 106 so as to become anchored thereto, and so as to provide a surface for the receipt of overprinting 112 applied to the upper surface of the keying coat, for example in the manner described in FIG. 1.

The keying coat 110 is shown as having been applied only on discrete areas, but it could be applied if appropriate over the entire web 100. Also, instead of applying overprinting 112 to the upper surface of the keying coat, there may be applied thereto a secondary label, as described herein.

FIGS. 3 and 4 show only one embodiment. In another embodiment the labels may be individual labels arranged in a stack.

Figure 5:
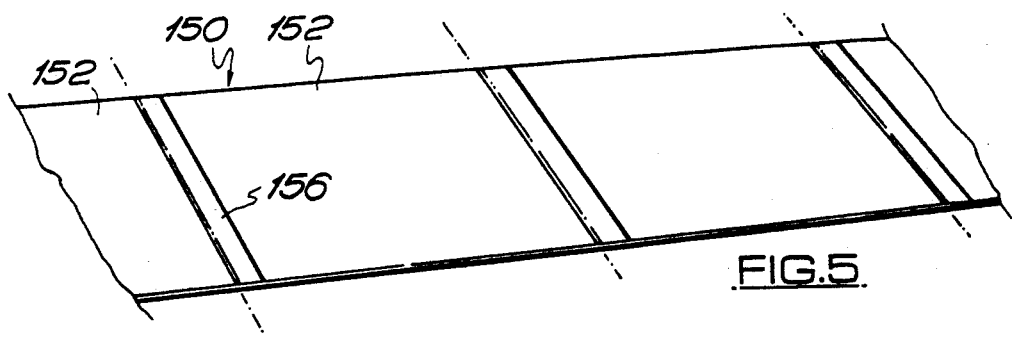
FIGS. 5 and 6 are similar to FIGS. 3 and 4 but show another embodiment of the invention.
Figure 6:
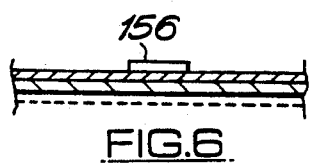
Figure 7:
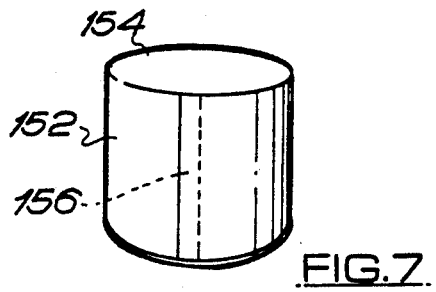
FIG. 7 shows an article to which the label of FIG. 5 has been applied.

The web 100 would be used in connection with a machine as shown in FIG. 1 and the labels 102 would be severed from the web 100 leaving a skeletal waste, so that the labels are in fact die-cut labels, but in the arrangement of FIGs. 5, 6 and 7, the labels are butt-cut labels wherein the web 150 is severed from edge to edge to cut each label 152 from the web. Each label is used for example as shown in FIG. 7 to be applied around the surface of a circular sectioned container such as the can 154 illustrated or a bottle.

At one end of each label 152 is provided a strip 156 of the keying coat, and this strip is in fact used as the means of adhering the overlapping ends of the label 152 when applied to the can 154 or other circular sectioned container. In this embodiment therefore there is no overprinting or secondary label applied to the keying coat, but the keying coat is in fact used as a means for adhesively connecting the overlapping edges of the label when applied to the container.

The invention provides a method, and an apparatus, for applying materials to silicone treated surfaces without having to use expensive and difficult to use silicone based self-adhesive labels, which allows for the application of ink jet and hot foil coding, and the effective application of secondary labels.

The present invention is adaptable to provide an adhesive surface for example where labels must be overlapped in the case of full wrap can labels. In such arrangement, on a leading edge of the label the key coat may be provided, and that key coat can serve as an adhesive in that the tail end of the label overlaps the applied key coat when the label is wrapped around the can. The invention therefore provides a full wrap round label with an edge provided with a key coat as referred to herein on an upper surface which has a silicone release characteristic, the key coat being provided at least on an area sufficient to cover the overlap.

I claim:

1. An improved linerless label of the type including a sheet substrate having silicone release coating on one side thereof and a pressure sensitive adhesive on the other side thereof, wherein the improvement comprises a keying coating applied to the release coating, at least a portion of said keying coating being outermost and exposed, said keying coating comprising a mixture of silicone low tack pressure sensitive adhesive and a solvent.

2. A linerless label according to claim 1, wherein the substrate is a web.

3. A linerless label according to claim 1, wherein the substrate comprises a primary label.

4. A linerless label according to claim 1, wherein the keying coating covers the entire surface of the substrate.

5. A linerless label according to claim 1, wherein the keying coating is applied on a discrete area of the substrate.

6. A linerless label according to claim 1, wherein the keying coating comprises a mixture of low tack pressure sensitive adhesive and toluene, said mixture having 50% solids and applied in a weight of 1–4 grams/sq. metre.

7. A linerless label according to claim 1 further comprising overprinting applied to the keying coating.

8. A linerless label according to claim 1, further comprising a secondary label applied to the keying coating.

9. A linerless label according to claim 1, wherein the substrate comprises a rectangular label for application on a wrap-around label to a bottle or can, said keying coating being applied as a strip at one end of the label which forms an overlap with the opposite end of the label when the label is applied.

* * * * *